United States Patent [19]
Chen

[11] Patent Number: 6,065,861
[45] Date of Patent: May 23, 2000

[54] BLENDER AND ASSEMBLING SUCH A BLENDER

[75] Inventor: Farmer Chen, Taipei, Taiwan

[73] Assignee: Quality & Strength Inc., Taiwan

[21] Appl. No.: 09/179,730

[22] Filed: Oct. 27, 1998

[51] Int. Cl.[7] ................................................. B01F 15/06
[52] U.S. Cl. .................... 366/144; 366/197; 366/199; 366/205; 99/348; 99/357; 99/513; 241/69
[58] Field of Search ................................... 366/205, 314, 366/144, 146, 199, 197; 241/65, 69, 73, 74, 101.1, 101.2; 99/348, 357, 509–513; 219/201, 473; 126/369

[56] References Cited

U.S. PATENT DOCUMENTS

| | | | |
|---|---|---|---|
| 3,005,399 | 10/1961 | Libson | 99/348 |
| 3,176,968 | 4/1965 | Apleton | 366/205 |
| 3,502,848 | 3/1970 | Fink | 99/348 |
| 5,525,781 | 6/1996 | Yahav et al. | 99/348 |
| 5,636,923 | 6/1997 | Nejat-bina | 366/205 |
| 5,662,032 | 9/1997 | Baratta | 366/205 |
| 5,690,021 | 11/1997 | Grey | 366/205 |
| 5,749,285 | 5/1998 | Dorner et al. | 366/146 |

FOREIGN PATENT DOCUMENTS 1145143  10/1957  France ..................... 366/205

*Primary Examiner*—Tony G. Soohoo
*Attorney, Agent, or Firm*—Ostrolenk, Faber, Gerb & Soffen, LLP

[57] ABSTRACT

A blender includes a motor base having a heating seat, a blender seat, a strainer and a container having a cutter blade on the bottom and a cap on the top. In operation, the container is placed on the blender seat of the motor base. The soup or juice is put into the container through the cap and is blended using the blade. Then, the soup or juice is transferred into a heating container through a second filter. After boiling the soup or juice in the heating container, a delicious soup will be made.

6 Claims, 4 Drawing Sheets

BLENDER AND ASSEMBLING SUCH A BLENDER

FIELD OF THE INVENTION

The present invention relates to a blender assembly and more particularly to a blender assembly which can perform both blending and boiling functions so as to separate dregs from juice or soup to produce an edible soup or juice.

BACKGROUND OF THE INVENTION

There are many steps which must be performed in preparing bean milk or rice milk for drinking. First, one has to blend the soy beans and water to produce a soup, and then use a filter to percolate the soup. The soup is then transferred into a pot to be boiled. By this process, the bean milk or the rice milk is made. Due to advances in industry, the previously manual task of blending the soy beans with water can be performed using a blender or an automatic citrus juicer. After blending, the soup is filtered and transferred into a cooking pot to be boiled. This process includes chopping, filtering, forming a melange and boiling, and consumes a large amount of space and time. Therefore, this process is extremely inconvenient.

SUMMARY OF THE INVENTION

The object of the present invention is to provide a blender using parts which combine the functions of blending and boiling.

The consumer can use a container to initially separate juice or soup from undesired solids and then transfer the soup or juice into a heating container to percolate the soup or the juice and then to boil the same. By this process, an edible soup or juice is made. Additionally, it also can make a vegetable pottage without any soup or juice is made. Additionally, it also can make a vegetable pottage without any difficulty.

It is another object of the present invention to provide a blender in which heat is conducted uniformly and no food material adheres to the cooking pot. The bottom surface of the heating container comprises an aluminum alloy, which enables the heat to be conducted uniformly and prevents the soup or juice from burning.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENTS

Figure 1:
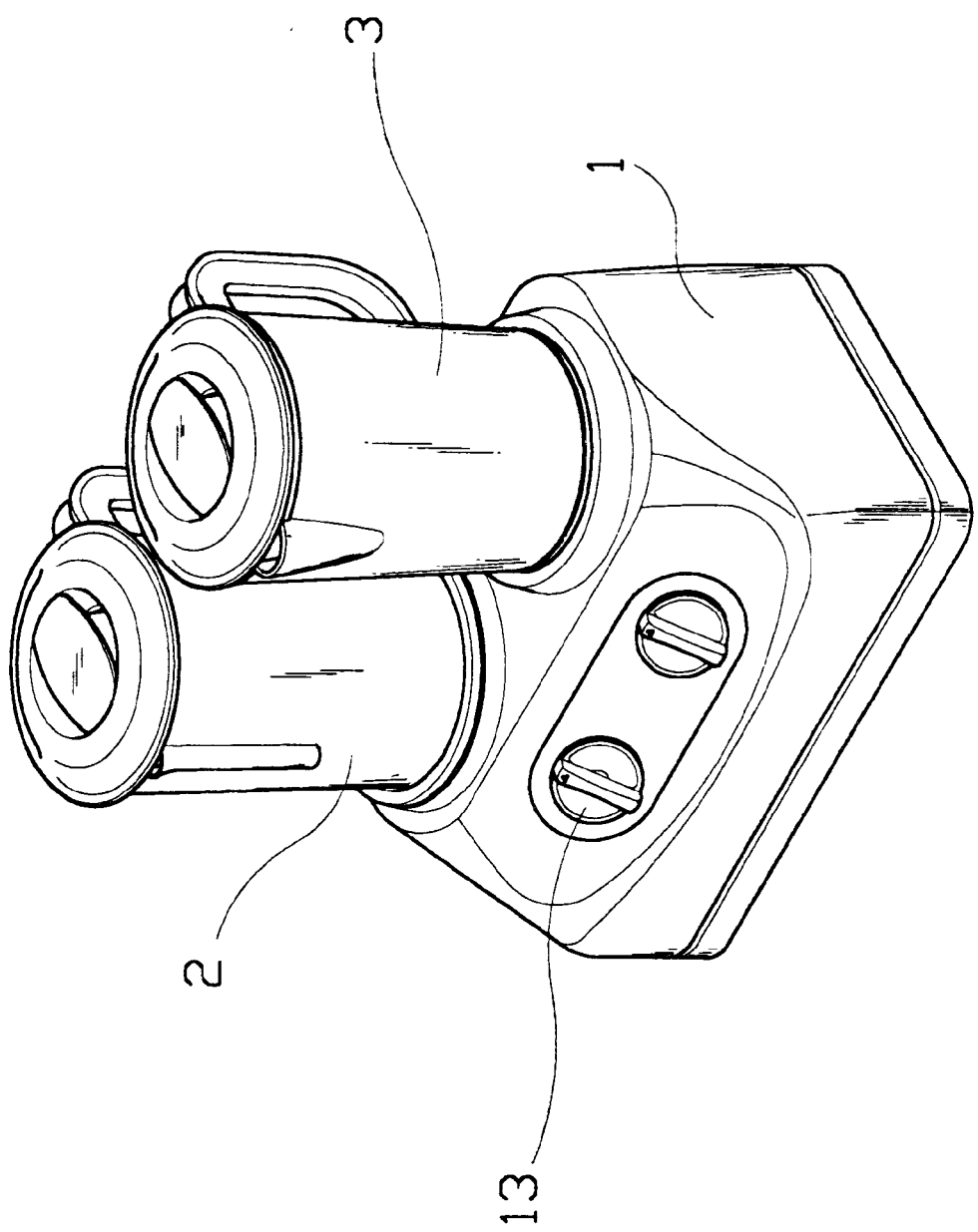
FIG. 1 is a perspective view showing the blender of the present invention.
Figure 2:
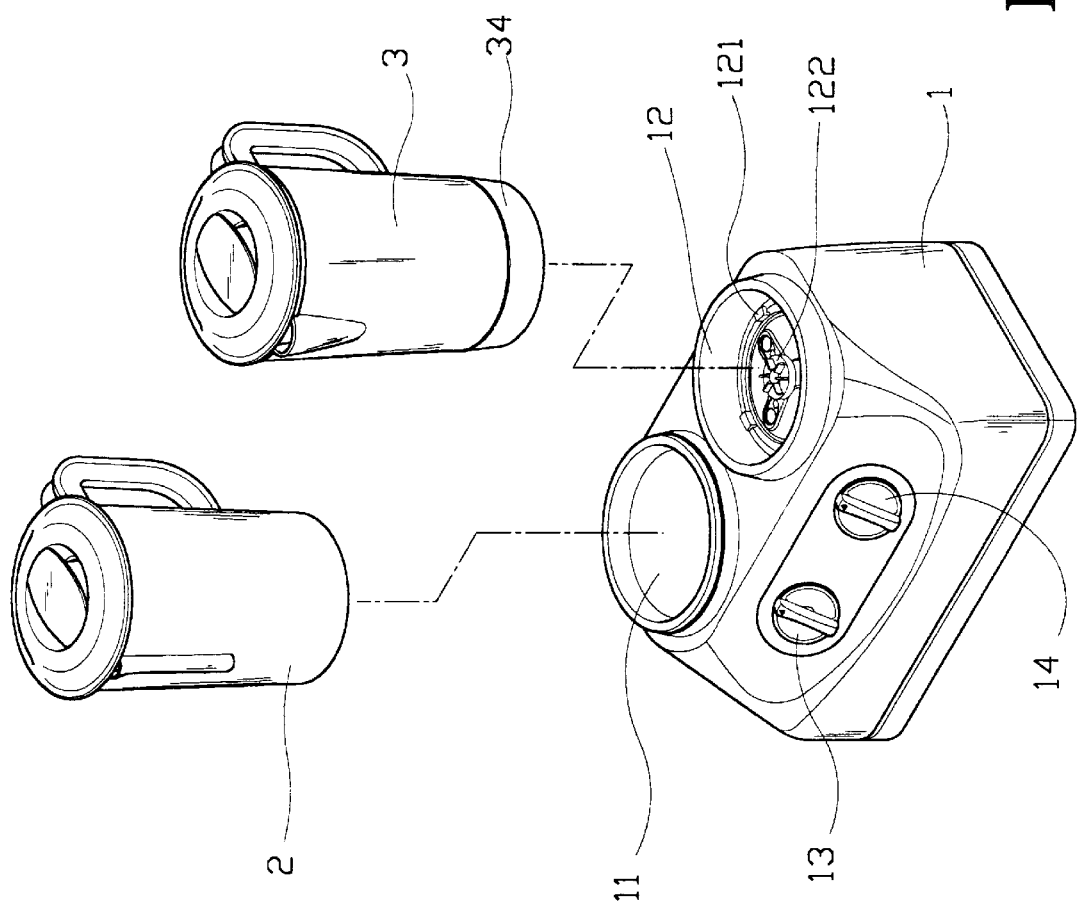
FIG. 2 is a perspective view showing the separate units of the blender of FIG. 1 in spaced relationship to each other.

With reference to FIGS. 1 and 2, a blender comprises a motor base 1, a heating container 2, and a container 3. The motor base 1 has a heating seat 11 to contain the heating container 2 and a blender seat 12 to contain the container 3, respectively. Using the container 3, the soup or juice is mixed and the juice is separated from undesired solids. Then, the soup or juice is placed into the heating container 2 through a second filter, and the soup is then boiled.

The top of the motor base 1 has a heating seat 11 and a blender seat 12 formed therein. The interior of the heating seat 11 has a heating device to provide a heating source. A knob 13 is located on one side of the motor base 1 to control the heating function. The bottom of the blender seat 12 has a fixing block to secure a container foot 34 of the container to the motor base 1. A transmitting disk 122 is provided at the center of the blender seat 12 to transmit torque to a cutter blade 341 (FIG. 3B) in the container foot 34, whereby the transmitting disk 122 will cause the cutter blade 341 to spin so as to chop up beans and vegetables or fruit placed inside the container 3. The side of the motor base 1 has a knob 14 to control the blending function.

Figures 3A, 3B:
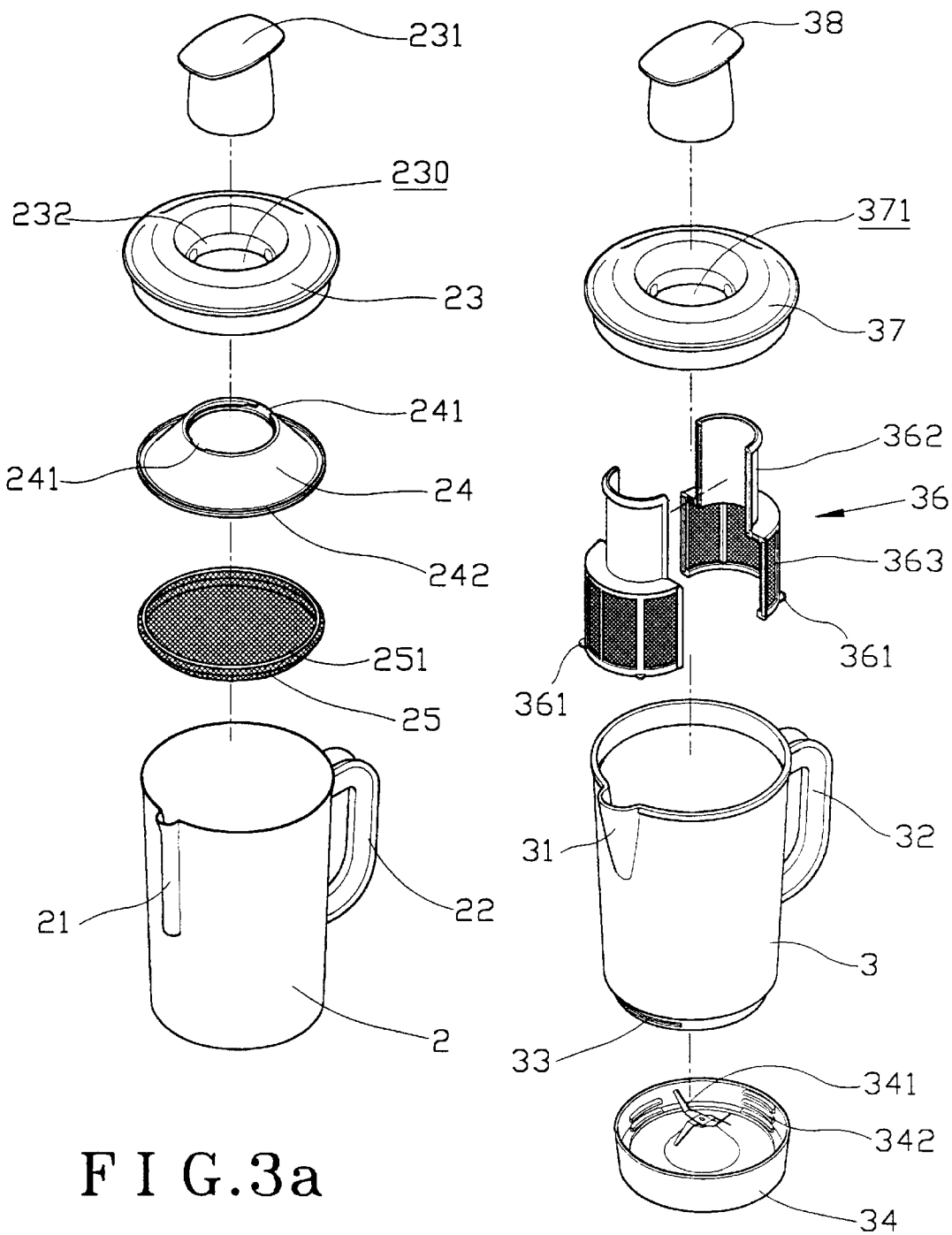
FIG. 3A is a an exploded perspective view showing the heating container.
FIG. 3B is a an exploded perspective view showing the container.
Figure 4:
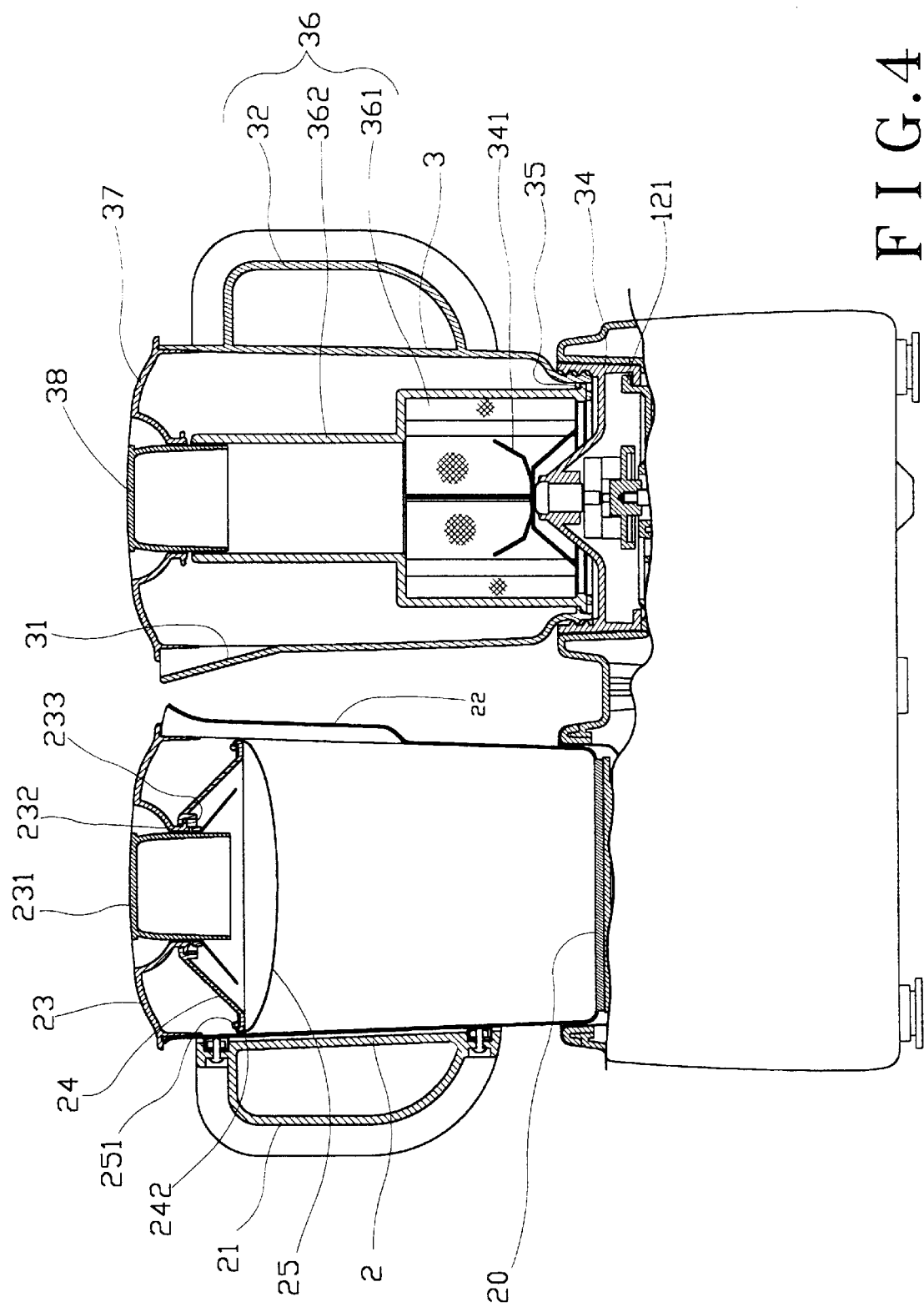
FIG. 4 is a side elevational and partial sectional view of the blender of FIG. 1.

With reference to FIG. 3A and FIG. 4, the bottom of heating container 2 is provided with a layer of an aluminum alloy 20 to enable heat to be conducted uniformly thereto. The upper part of the heating container 2 has a convex spout 21 and a handle 22 on the body of the heating container at a position diametrically opposite to the spout 21. There is a cover 23, and a hole 230 at the center of the cover 23. A cap 231 conjugates with the hole 230, and there are some projecting portions 233 located along the bottom edge of a wall 232 to secure the frame of the strainer 24. The strainer 24 has a frustoconical shape. The upper edge has a conjugate part 241, which is formed with an "L" shape. To attempt to conjugate the cap 23, the cap 23 is placed on the structure 24 with the projecting ports 233 in alignment with the conjugate part 241, and the cap 23 is spun slowly. The projection portions 233 become locked under the conjugate part 241 to thereby fix the strainer 24 and the cap 23. Additionally, there is a convex ring 242 placed along the bottom edge of the strainer frame 24 to hold a strainer 25. The strainer 25 is a second filter and is made of a cloth or a tiny mesh material. The open border 251 of the strainer 25 is made of elastic and plastic material to attach to the bottom of the strainer 25.

With reference to FIG. 3B, the container 3 has a spout 31 and a handle 32 which are similar to the heating container 2. In the container 3, the exterior of the bottom is provided with outer screw thread 33 which is conjugated with an inner screw thread 342 provided in the container foot 34. The center position of the container foot 34 has a cutter blade 341 to chop the food. The inner bottom edge of the container 3 has a connection arrangement 35 to hold the connecting block 361 of the strainer 36 fixed in the container 3. The strainer covers 36 are composed of two semi-cylindrical parts each having an upper part 362 and a lower part 363. The lower part is made of a strainer-type mesh to separate out dregs by trapping them in the strainer 36 while the juice or soup flows through. Since the radius of the upper part 362 is smaller than the lower part, the radius is as same as that of the hole 371 in the cover 37 of the container. Furthermore, there is a cap 38 placed in the hole 371 of the cover 37.

With reference to FIG. 4, in order to make the bean milk, it is necessary to remove the cap 38 of the container 3 and pour the yellow bean into the strainer 36 of the container 3 by the hole 371 of the cap 37, while adding some water at the same time. Then, the transmitting disk 122 is activated so that the cutter blades 341 spin smoothly. A thick soup or juice is produced, while the strainer 36 retains the bean solids. The container 3 is removed from the motor base 1, the cap 231 is removed, and the thick soup is poured into the heating container 2 through the hole 230 of the cap 23, whereupon the soup or juice is filtered a second time. The heating device is then heated in the heating seat 11, whereby the soup then becomes ready to eat after boiling. A vegetable pottage can be made in the same way.

While this invention has been depicted and described with reference to the preferred embodiment, it will be understood by those skilled in the art that modifications and changes may be made therein while retaining the spirit and scope of the invention. It is therefore intended that the following claims include all such changes and modifications that include the true spirit and scope of the invention.

What is claimed is:

1. A blender comprising:

a motor base including a heating seat and a blender seat;

a container having a top end, a bottom, and an interior, the container including a cutter blade on the bottom, the container being seatable on the blender seat of the motor base;

a heating container having a top end, a bottom, and an interior, the heating container being seatable on the heating seat;

cover which is removably placeable on the top end of one of the container and the heating container; and a strainer attachable to the interior of one of the container and the heating container.

2. The blender as claimed in claim 1, wherein the heating container has a layer of aluminum alloy on the bottom to enable uniform heating of the heating container.

3. The blender as claimed in claim 1, wherein the cover has a hole at the center thereof; and further comprising a cap which conjugates with the hole.

4. The blender as claimed in claim 3, wherein the strainer includes a frame having an upper edge and a bottom edge, the hole in the cover is defined by a wall extending from the cover downward to a bottom edge thereof, there are some projecting portions on the bottom edge of the wall to contain the frame of the strainer, and the upper edge of the strainer frame is formed with an "L" shape to conjugate with the projecting portions on the bottom edge of the wall.

5. The blender as claimed in claim 4, wherein the strainer has a frustoconical shape and includes a convex ring placed along the bottom border of the strainer frame to hold the strainer.

6. The blender as claimed in claim 3, wherein the strainer is dividable into two symmetrical semi-cylindrical parts, each semi-cylindrical part having an upper part and a lower part, the lower part being composed of a straining mesh, and the upper part having a radius which is smaller than that of the lower part and which is the same as that of the hole in the cover.

* * * * *